Figure 1:
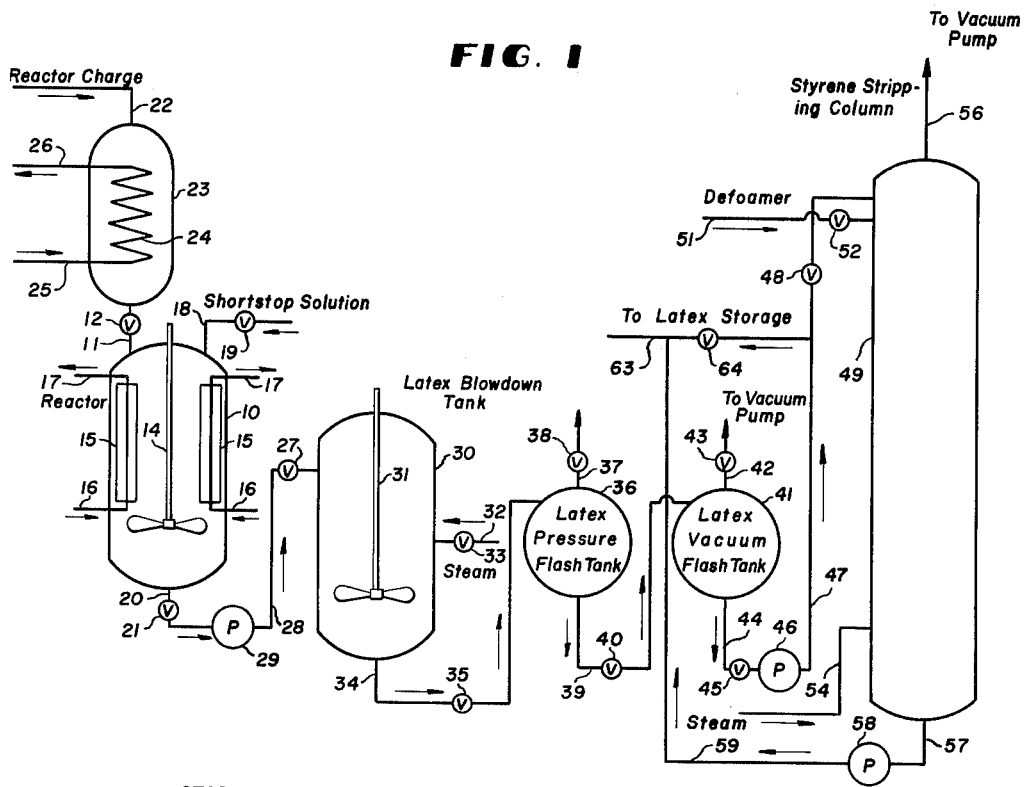

Oct. 26, 1965    J. P. McKENZIE ETAL    3,214,401
PROCESS FOR AGGLOMERATING SYNTHETIC RESIN LATEX BY
FREEZING AND THAWING IN THE PRESENCE
OF A SWELLING AGENT
Filed July 11, 1960    2 Sheets-Sheet 1

STABILITY OF HIGH STYRENE LATICES TO FREEZE/THAW SOLVENT AGGLOMERATION

INVENTORS
JAMES P. McKENZIE
GEORGE R. HUDDLESTON, JR.
BY Shanley & O'Neil
ATTORNEYS

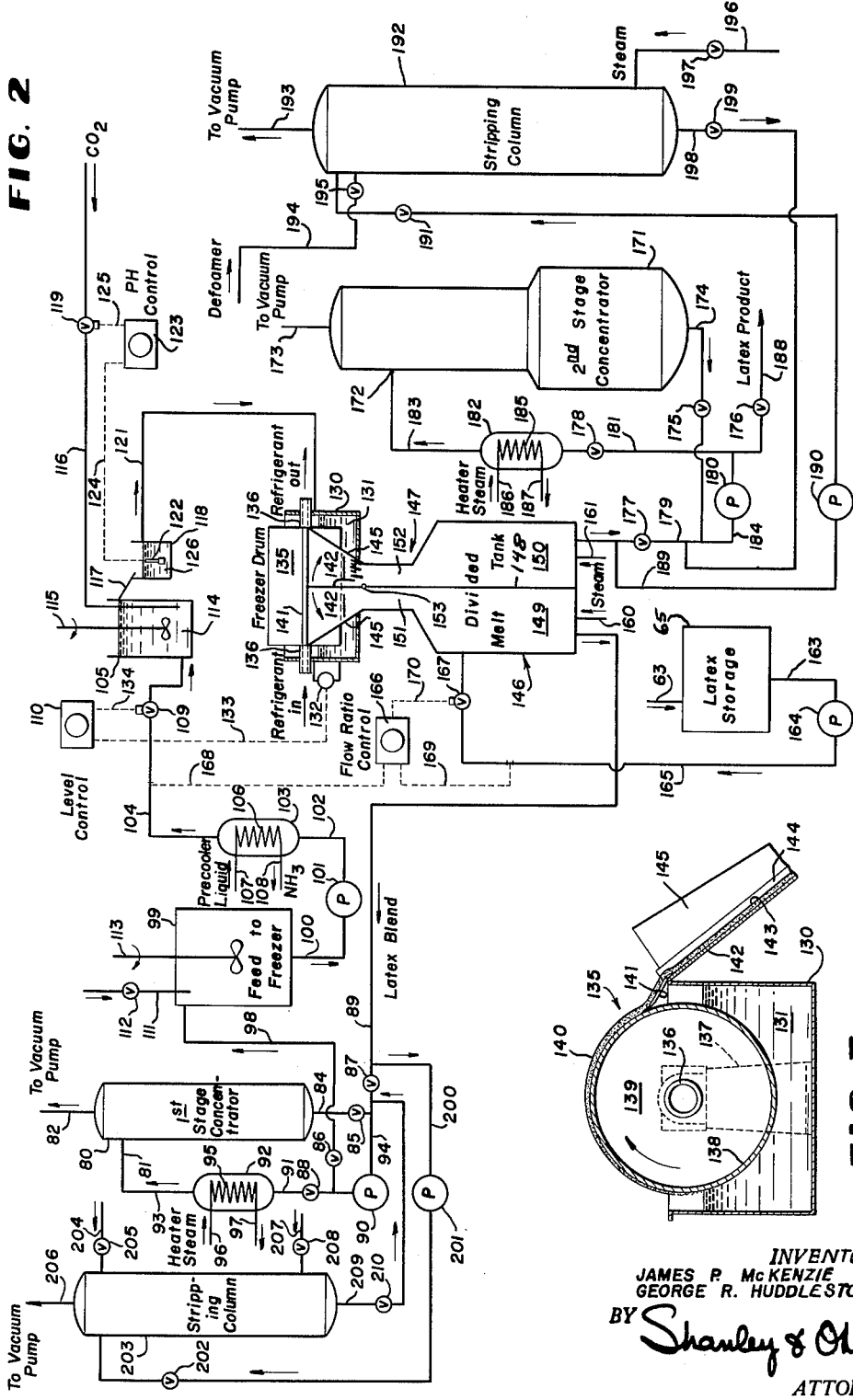

United States Patent Office 3,214,401
Patented Oct. 26, 1965

3,214,401
PROCESS FOR AGGLOMERATING SYNTHETIC
RESIN LATEX BY FREEZING AND THAWING
IN THE PRESENCE OF A SWELLING AGENT
James P. McKenzie and George R. Huddleston, Jr., Baton
Rouge, La., assignors to Copolymer Rubber & Chemical Corporation, a corporation of Louisiana
Filed July 11, 1960, Ser. No. 42,068
3 Claims. (Cl. 260—29.6)

This invention broadly relates to the preparation and processing of synthetic polymer latices and to the latex product thus produced. In some of its more specific aspects, the invention further relates to the agglomeration and concentration of latices of synthetic resinous polymers and to the preparation of low viscosity high solids latex products.

Latices for use in practicing the present invention may be prepared by processes well known in the art such as, for example, prior art processes wherein polymerizable material is emulsified in an aqueous medium by means of an emulsifying agent which may be a faty acid soap or other suitable surface active agent, and then polymerized under suitable controlled reaction conditions in the presence of a catalyst and other regulating materials. The polymerization is usually "short-stopped" at a stage in the polymerization before complete conversion of the monomer or monomers to polymer is reached such as, for example, at about 60–70% conversion, and then the unreacted monomer or monomers separated from the resulting unstripped latex by flashing and/or steam distillation. The stripped latices so prepared may be concentrated to a higher solids content by known methods, or coagulated with a conventional coagulant to produce solid polymer.

In many industrial processes using synthetic polymer latex, such as in the manufacture of foam rubber or latex paints, it is desirable that latex have certain properties among which are a high solids content such as 50–60% TSC (total solids content) or higher and a low viscosity such as less than about 1000 centipoises at 60% TSC. Within reasonable limits, usually the higher the solids content and lower the viscosity, the more desirable the latex. Still another important consideration is the mechanical stability of the latex. If it does not exhibit satisfactory mechanical stability properties, then a substantial proportion of the polymer content of the latex will be irreversibly coagulated during handling and storage prior to use, i.e., form "prefloc," which is very undesirable.

The viscosity of synthetic latex at a given temperature and solids content is largely determined by the average particle size of the polymer and the distribution of particle size. It is generally accepted that a large average particle size and wide uniform distribution of particle size are desirable and result in a lower viscosity latex. As the solids content is increased, or the temperature decreased, then the viscosity of a latex having a given average particle size and distribution of particle size increases, and especially at higher solids content.

Many attempts have been made to prepare satisfactory low viscosity high solids latices. One of the more common processes involves emulsion polymerization in an aqueous medium of suitable monomers, with or without comonomers, using an emulsion polymerization recipe for high solids content. The quantity of water used in such a recipe is kept at a minimum, as are the number of soap micelles serving as centers of polymerization. Thus, a relatively small number of particles of polymer are activated and the end result is an increase in the average particle size of polymer in the resultant latex. This procedure is not satisfactory from the commercial standpoint for a number of reasons, among the more important being the extremely long reaction time required and the difficulty of controlling the temperature, reaction rate and viscosity during polymerization. Also, the viscosity of the finished latex product is relatively high in many instances and a uniform low viscosity high solids latex product is difficult to produce on a commercial scale.

A more recent process for producing high solids synthetic rubber latices involves the agglomeration of low solids small average particle size latex using a freeze-thaw agglomeration process and then concentrating the agglomerated latex to a desired solids content. Since small average particle size latex may be prepared using a conventional fast reaction recipe at low solids content in only a fraction of the reaction time required for polymerization when using a recipe at high solids content and without the attendant production problems, such processes are commercially attractive. The presently practiced freeze-thaw agglomeration process followed by concentration of the agglomerated latex to a high solids content has been highly successful from a commercial standpoint for the production of low viscosity, high solids synthetic rubber latices. However, the process has limitations as it is only commercially acceptable for the production of synthetic rubber latices. When a latex of a polymer which has largely resinous characteristics as distinguished from latices of rubbery polymers is processed, then there is little or no enlargement in the average particle size of the latex and prefloc formation during freeze-thaw agglomeration rises to a level which is uneconomic. Thus, it has not been possible heretofore to produce latices of resinous polymers having a high solids content, a low uniform viscosity and a good mechanical stability without encountering a prohibitive amount of prefloc during freeze-thaw agglomeration. Additionally, it has been necessary to recycle a substantial proportion of the frozen and thawed agglomerated latex back to the freeze-thaw agglomeration step in order to provide an acceptable level of agglomeration, with an accompanying reduction in the throughput which is obtainable for a given apparatus.

In accordance with one important embodiment of the invention, it has been discovered that if latex is frozen and thawed in the presence of a swelling agent for the polymer as described herein, with the particles of polymer being swollen by the swelling agent at the time of freezing and thawing the latex, then latex of resinous polymers may be readily agglomerated and prefloc formation greatly reduced and controlled to a commercially acceptable level. Additionally, in some instances, latex of rubbery polymers also may be more readily agglomerated in the presence of the swelling agent and thus the invention may be practiced to improve the freeze-thaw agglomeration characteristics of specific synthetic rubber latices which formerly were difficult to agglomerate.

It is an object of the present invention to provide a novel process for enlarging the average particle size of polymer in latex wherein the latex is agglomerated by steps including freezing and thawing.

It is a further object of the present invention to provide a process for enlarging the average particle size of latices of synthetic resinous polymers wherein the latex is agglomerated by steps including freezing and thawing and prefloc formation may be reduced and controlled within commercially acceptable limits.

It is still a further object of the present invention to provide a novel process for concentrating latex by a process involving freeze-thaw agglomeration of the latex in accordance with the invention, followed by concentration of the resultant latex to a higher solids content.

It is still a further object of the present invention to provide a novel process for agglomerating latex of relatively low solids and small average particle size synthetic resinous polymers in the presence of a swelling agent, and then concentrating the resultant agglomerated latex to produce a low viscosity, high solids latex product.

It is still a further object of the present invention to provide a process for increasing the freeze-thaw stability of latex.

It is still a further object of the present invention to provide improved latices prepared by the foregoing processes of the invention.

Figure 4:
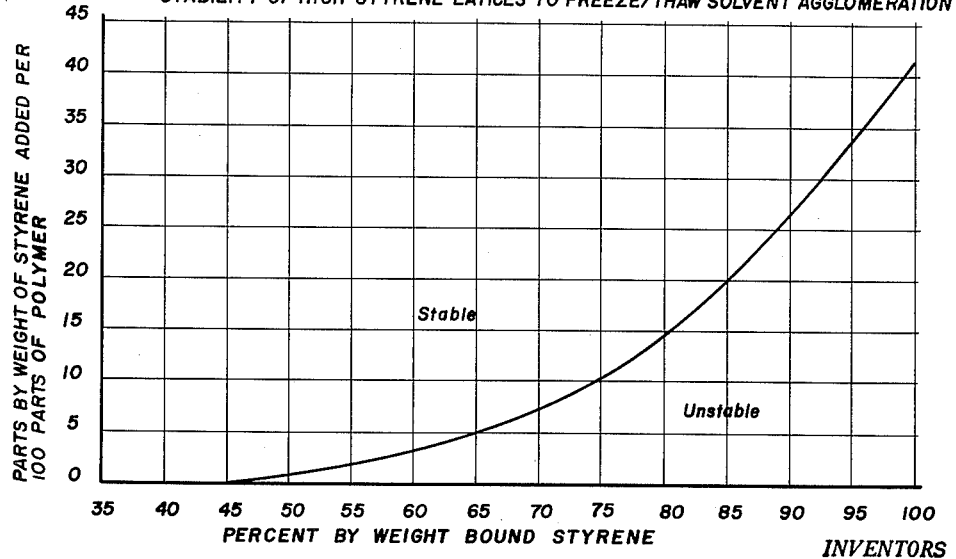

Still other objects and advantages of the invention will be apparent to those skilled in the art by reference to the following detailed description, the specific examples and the drawings, wherein:

FIGURES 1 and 2 diagrammatically illustrate one suitable arrangement of apparatus for the preparation and processing of latex in accordance with the invention to produce high solids synthetic polymer latex;

FIGURE 3 is an enlarged side view in section of a freezer drum and freezer drum tanks suitable for the freezing of latex in accordance with the invention; and FIGURE 4 is a graph illustrating the manner in which the parts by weight of styrene to be added to latex of a copolymer of styrene and butadiene, or styrene latex, vary with percent by weight bound styrene content in the polymer, when calculated by weight for each 100 parts of latex solids.

Referring now to FIGURE 1 of the drawings, reactor 10 may be a pressure vessel suitable for polymerizing polymerizable material such as butadiene and styrene to form latex by an aqueous emulsion polymerization process. The reactor 10 may be provided with an inlet conduit 11 including normally closed control valve 12 for charging reactants and other ingredients comprising a prior art recipe for styrene-butadiene latex, an agitator 14, tube bundles 15 for controlling the polymerization temperature and conduits 16 and 17 for supplying to and withdrawing from, respectively, a controlled quantity of liquefied ammonia or other substance capable of maintaining a desired polymerization temperature, conduct 18 including normally closed control valve 19 for supplying short-stop solution to the contents when the desired percent conversion of monomers to polymer is reached and thereby terminate the polymerization, and outlet conduit 20 including normally closed control valve 21 for withdrawing the resultant latex. When charging reactor 10, valve 12 in conduit 11 is opened and the reactants and other ingredients comprising a prior art recipe including butadiene and styrene, soap solution, water, initiators or catalysts and regulator or modifiers may be charged to reactor 10 in the usual sequence and desired quantities through conduit 22, heat exchange unit 23 and conduit 11. A heat exchange fluid such as cold water may be supplied to and withdrawn from coil 24 in unit 23 via conduits 25 and 26, respectively, for the purpose of allowing the reactants and other ingredients to be charged to reactor 10 at a desired temperature, preferably at a temperature in the vicinity of the polymerization temperature to thereby reduced the initial thermal load on the tube bundles 15 which may be provided in reactor 10. For the purpose of simplifying the discussion, the preparation of styrene-butadiene latex having a high bound styrene content will be described hereinafter. However, it is understood that polystyrene or other latices may be prepared by conventional practices, if desired.

After charging reactor 10, valve 12 in conduit 11 is closed and the polymerization may be allowed to proceed with agitation of the reactor contents and preferably while closely controlling the polymerization temperature until the desired percent conversion of monomers to polymer is reached. At a suitable stage, e.g., when about 60% by weight of the total weight of butadiene and styrene charged to reactor 10 is converted to polymer, the polymerization is terminated, i.e., "short-stopped" by opening valve 19 and supplying via conduit 18 an aqueous solution of sodium dimethyldithiocarbamate and sodium polysulfide or other suitable short-stop solution to the contents of reactor 10. The short-stop solution is blended with the unstripped latex contents of reactor 10 and then valves 21 and 27 in conduits 20 and 28, respectively, are opened and the unstripped latex is transferred by means of pump 29 via conduits 20 and 28 from reactor 10 to latex blowdown tank 30. The valve 27 in conduit 28 is closed after transfer of the unstripped latex.

The latex blowdown tank 30 may be provided with a conduit 32 including control valve 33 for supplying desuperheated steam, and conduit 34 including control valve 35 for withdrawing the contents. The unstripped latex in blowdown tank 30 may contain as unreacted monomers about 40% by weight of the total weight of butadiene and styrene charged to reactor 10 and the latex may be warmed with agitation to a suitable temperature such as 120° F. by means of desuperheated steam supplied via conduit 32 and opened valve 33. Warming the latex in this manner results in a pressure of about 40 p.s.i.g. within latex blowdown tank 30 and, since the pressure within latex pressure flash tank 36 is maintained at an appreciably lower pressure, upon opening valve 35 the unstripped latex may be transferred by differential pressure via conduit 34.

The latex pressure flash tank 36 is provided with conduit 37 including control valve 38 for withdrawing vaporized butadiene, and conduit 39 including control valve 40 for withdrawing partially stripped latex. A suitable pressure slightly above atmospheric pressure, such as 2 p.s.i.g., may be maintained within latex pressure flash tank 36. Under the prevailing temperature and pressure conditions, most of the unreacted butadiene content of the unstripped latex may be vaporized and removed via conduit 37 upon opening control valve 38.

The latex is withdrawn from flash tank 36 via conduit 39 upon opening valve 40 and passed to latex vacuum flash tank 41. Inasmuch as tank 41 is maintained at a suitable reduced pressure such as about 188 mm./Hg absolute by means of a vacuum maintained on conduit 42 including opened control valve 43, the latex may be transferred by differential pressure and without the need for pumping means. During residence within latex vacuum flash tank 41, all but trace amounts of the remaining unreacted butadiene content of the latex may be vaporized and the vapors removed via conduit 42. The partially stripped latex containing substantially all of the unreacted styrene is withdrawn from tank 41 via conduit 44 upon opening valve 45. In the event the styrene monomer content of the latex is to be retained for use as the polymer swelling agent in the freeze agglomeration process to be described below, then upon closing valve 48 and opening valve 64 the latex is transferred by means of pump 46 via conduits 47 and 63 to latex storage tank 65 shown in FIGURE 2 of the drawings. If the styrene monomer content is not to be used as a swelling agent, then valve 64 is closed, valve 48 opened and the latex is passed to column 49 via conduit 47.

The styrene stripping column 49 may be of a conventional "Standard Government Plant" design and provided with a conduit 51 including control valve 52 for feeding defoamer to an upper portion, and conduit 54 for supplying desuperheated steam to the lower portion. The column 49 may be operated under conventional conditions for stripping styrene from latex. The latex feed entering at the top passes downward through column 49 in countercurrent relationship with desuperheated steam supplied via conduit 54. Simultaneously, a defoamer such as methyl silicone is fed via conduit 51 and opened control valve 52 for the purpose of suppressing foaming. The column 49 may be operated at a temperature varying from about 120–130° F. at the top of the column to about 140–165° F. at the bottom of the column, with the pressure at any given point in the column being in equilibrium with the temperature. As the latex feed passes downward through column 49, any remaining traces of butadiene monomer and the styrene monomer content are separated by vaporization, i.e., steam distillation, and the resulting monomer vapors together wtih the steam content is withdrawn via conduit 56. The stripped latex is withdrawn via conduit 57 and transferred by pump 58 via conduits 59 and 63 to a latex storage tank 65.

Referring now to FIGURE 2, the first stage concentrator 80 may be of conventional design suitable for thermally concentrating synthetic rubber latices. The concentrator 80 may be provided with a feed inlet 81 in the upper portion thereof, an exhaust conduit 82 leading from the top to a vacuum pump (not shown), and a conduit 84 provided with valve 85 for withdrawing the contents. When charging concentrator 80, the valves 85 and 86 are closed, and valves 87 and 88 are opened. A latex blend may be passed via conduit 89 to pump 90, and then forced by means of pump 90 through conduit 91, heater 92, conduit 93 and feed inlet 81 into concentrator 80. After introducing the desired quantity of latex blend into first stage concentrator 80, valves 87 and 210 are closed, valve 85 opened and the latex charge continuously recycled through conduit 91, heater 92, conduit 93, first stage concentrator 80, conduit 84 and portion 94 of conduit 89 by means of pump 90 until concentrated to a desired dry solids content. During the recycling step, steam may be supplied to and withdrawn from coil 95 in heater 92 by conduits 96 and 97, respectively, thereby continuously heating the latex blend. Also, concentrator 80 is maintained under a reduced pressure such as 28 inches of mercury vacuum by suction on exhaust conduit 82, thus allowing a portion of the volatile contents (largely water and any volatile swelling agent present) to evaporate. The vapors are withdrawn from the system via exhaust conduit 82. When the latex blend is concentrated to a desired dry solids content, such as about 40–45% TSC, valve 88 is closed, valve 86 opened and the latex charge is withdrawn and transferred by means of pump 90 via conduit 98 to freezer feed tank 99.

The feed tank 99 is provided with conduit 111 including control valve 112 for feeding a swelling agent for the polymer to the latex contents and an agitator 113. The swelling agent is fed in an amount fully discussed hereinafter and the contents agitated to assure intimate contact between the swelling agent and particles of polymer to thereby swell the same. Preferably, the feed tank 99 is of a capacity providing a sufficient average residence time to assume swelling of the polymer such as 1–3 hours or longer.

The latex is passed from feed tank 99 via conduit 100 to pump 101, and then through conduit 102, precooler 103 and conduit 104 into the lower portion of pH adjustment tank 105. A cooling fluid such as liquid ammonia is supplied to and withdrawn from coil 106 in precooler 103 by conduits 107 and 108, respectively, for the purpose of precooling the latex to a desired temperature such as 40° F. and thereby lowering the refrigerant requirement in the freezing apparatus to be described hereinafter. The flow rate of latex through conduit 104, i.e., the latex feed rate to tank 105, is controlled by means comprising level control valve 109 which is operated by level controller 110.

The pH adjustment tank 105 is provided with an agitator 115, conduit 116 and overflow spout 117 leading to container 118. Usually the pH of the latex feed to tank 105 is about 10 and, if desired, the pH may be adjusted to the most effective value for agglomeration by a freezing process. When the pH is too high for optimum agglomeration, a suitable acidic substance such as carbon dioxide may be fed via conduit 116 into the latex 114 contained in the lower portion of tank 105 at a feed rate controlled by means of control valve 119, the feed rate being such as to effect adjustment of the pH to a desired predetermined value such as 7.8 to 8.5. The carbon dioxide is added in a quantity sufficient to adjust the pH to a desired value, but not in an amount or manner such as to cause the formation of an objectionable amount of prefloc.

The container 118 is provided with an overflow conduit 121 and a pH electrode 122 positioned so as to be immersed in the latex 126. A pH controller 123 is operatively connected in a conventional manner with pH electrode 122 and control valve 119 by means of connections 124 and 125, respectively, for the purpose of measuring the pH of the latex overflowing from tank 105 and operating control valve 119 in response to changes in pH of the overflowing latex, thereby controlling the feed rate of substance within conduit 116 and in this manner maintaining the pH at a desired value.

The latex is passed from container 118 via conduit 121 to freezer drum tank 130. The latex 131 contained in tank 130 is maintained at a desired operating level by means comprising level controller 110. The level controller 110 is operatively connected in a conventional manner with a latex level sensitive means 132 and control valve 109 by means of connections 133 and 134, respectively, and operates control valve 109 in response to changes in the level of latex within tank 130. Inasmuch as the feed rate of latex to freezer drum 130 is determined by the rate of overflow from container 118, which in turn is determined by the rate of overflow from and the feed rate to tank 105, it is apparent that the latex level in freezer drum 130 may be readily controlled in this manner.

As best seen in FIG. 3, freezer drum 135 is rotatably mounted in tank 130 on hollow trunnions 136 supported by trunnion support means 137. It will be noted that the freezer drum 135 is so mounted in freezer drum tank 130 as to be partially submerged in latex 131. In addition to performing their usual function, as diagrammatically illustrated in FIGURE 2, the hollow trunnions 136 serve as conduits for the passage of a suitable refrigerant such as liquid ammonia through the interior or freezer drum 135. Referring again to FIGURE 3, the rotating outer freezer drum surface 138 is maintained at a temperature sufficiently low so as to collect a film of latex 140 by a freezing action by means of refrigerant supplied at a controlled rate to the drum interior 139. A satisfactory temperature for the outer freezer drum surface 138 when the freezer drum 135 is about 4 feet in diameter and rotated at about one to 2.5 r.p.m. has been found to be about −2° F. to −18° F. As the freezer drum 135 rotates in a clockwise direction, the frozen film of latex 140 agglomerated by the freezing action is removed by scraper 141 and deposited upon surface 142. It will be noted that the frozen and agglomerated latex 143 thus removed is divided into two portions by means of divider blade 144 and is then guided downward along surface 142 by means of baffles 145 and divider blade 144.

Referring now to FIGURE 2, the melt tank 146 is provided on its upper end with chute 147. The surface 142 and baffles 145 are joined at their lower ends to the upper end of chute 147 thereby providing means for transferring the frozen latex from the scraper 141 to the melt tank 146. A partition 148 divides melt tank 146 into two compartments 149 and 150 and chute 147 into two chute portions 151 and 152. The lower portion of divider blade 144 is attached to the upper portion of partition 148 by a hinged connection 153, thereby allowing divider blade 144 to be adjusted to any point along scraper 141. This arrangement provides for the division and transfer of any desired proportion of the frozen latex to either compartment of melt tank 146.

A suitable heating medium such as steam is supplied to the bottom of compartments 149 and 150 via conduits 160 and 161, respectively, for thawing the frozen latex therein. The storage tank 65 is provided with an inlet conduit 63 leading to a source of latex (see FIGURE 1) having a relatively small particle size. A latex blend is prepared in compartment 149 by withdrawing latex having a relatively small average particle size from storage tank 65 via conduit 163 and transferring the same by means of pump 164 via conduit 165 into compartment 149 where it is blended with the frozzen and thawed agglomerated latex having a relatively large particle size. The flow ratio controller 166 is operatively connected in a conventional manner with conduit 104, conduit 165 and control valve 167 by connections 168, 169 and 170, respectively, and operates control valve 167 in response to changes in the rate of flow in conduit 104 to thereby maintain the desired flow ratio within conduits 104 and 165, and in this manner continuously prepare a latex blend having a desired ratio of the two latices.

The second stage concentrator 171 is a conventional concentrator of a type suitable for thermally concentrating synthetic rubber latices to a high solids content. The general construction and operation of concentrator 171 may be substantially the same as described hereinbefore for first stage concentrator 80. The concentrator 171 is provided with a latex feed inlet 172 in the upper portion thereof, an exhaust conduit 173 leading from the top of the concentrator to exhaust means such as a vacuum pump (not shown) and a conduit 174 provided with valve 175 for withdrawing the contents. When charging concentrator 171 in instances where it is not desired to first remove the swelling agent content of the latex, the valves 175, 176, 191 and 199 are closed, valves 177 and 178 opened, and frozen and thawed agglomerated latex blend is withdrawn from compartment 150, passed via conduit 179 to pump 180, and then forced by means of pump 180 through conduit 181, heater 182, conduit 183 and feed inlet 172 into second stage concentrator 171. After introducing the desired quantity of frozen and thawed agglomerated latex into second stage concentrator 171, valve 177 is closed, valve 199 remains closed, valve 175 is opened, and the latex charge continuously recycled through conduit 181, heater 182, conduit 183, second stage concentrator 171, conduit 174 and portion 184 of conduit 179 by means of pump 180 until concentrated to a desired dry solids content. During the recycling step, a suitable heating fluid such as steam is supplied to and withdrawn from coil 185 in heater 182 by conduits 186 and 187, respectively, thereby continuously heating the latex. Second stage concentrator 171 is maintained under a suitable reduced pressure such as 28 inches of mercury vacuum by suction on exhaust conduit 173 thus allowing a portion of the volatile contents (largely water and swelling agent, if present) to evaporate. The vapors are withdrawn from the system via exhaust conduit 173. When the latex is concentrated to a desired solids content, such as about 60 to 65% TSC, valve 178 is closed, valve 176 opened, and the final latex product is withdrawn via conduit 188.

While an essentially continuous process is illustrated in the drawings and specifically described herein, it is also possible to use a batch process, or to perform one or more of the various steps of the continuous process on a batch basis.

In instances where it is desired to remove the swelling agent content of the latex prior to passing it to concentrator 171, this may be accomplished by following the above procedure with the exception of closing valve 177, opening valves 191 and 199, and first transferring the latex by means of conduit 189 and pump 190 to the upper portion of stripping column 192. The column 192 may be similar to column 49 in construction and operation, and it is provided with a conduit 194 including control valve 195 for feeding defoamer to an upper portion, conduit 196 including control valve 197 for feeding steam to a lower portion, conduit 198 including control valve 199 for withdrawing stripped latex and conduit 193 connected to a vacuum pump (not shown) for withdrawing vapors of the swelling agent. The latex feed entering the top of column 192 via conduit 189 passes downward in countercurrent relationship with the steam supplied via conduit 196 and, simultaneously, defoamer is fed via conduit 194 to suppress foaming. The resultant stripped latex is passed from the bottom of the column to conduit 179 via conduit 198, and then to concentrator 171 as described above.

The latex blend flowing in conduit 89 may be by-passed around concentrator 80 by closing valve 88 and opening valve 86. This may be desirable where a swelling agent such as styrene is present which would be adversely affected by the concentration step. In instances where it is desired to remove the swelling agent and then pass the latex to concentrator 80, this may be accomplished by closing valve 87, opening valves 202, 208, 88 and 86, and transferring the latex by means of conduit 200 and pump 201 to the upper portion of stripping column 203. The column 203 likewise may be similar to column 49 in construction and operation, and it is provided with a conduit 204 including valve 205 for feeding defoamer to an upper portion, conduit 207 including control valve 208 for feeding steam to a lower portion, conduit 209 including control valve 210 for withdrawing stripped latex and conduit 206 connected to a vacuum pump (not shown) for withdrawing vapors of the swelling agent. The latex feed entering the top of column 203 via conduit 200 passes downward in countercurrent relationship with the steam supplied via conduit 207 and, simultaneously, defoamer is fed via conduit 204 to suppress foaming. The resultant stripped latex is passed from the bottom of the column to conduit 89 via conduit 209, and then to concentrator 80 as described previously.

Where unstripped latex is fed to storage tank 65 and it contains unreacted monomer such as styrene in an amount sufficient to assure or aid in assuring freeze-thaw stability, then the requirement for additional swelling agent may be eliminated or partially eliminated by closing valves 202, 210, 85 and 88, and opening valves 86 and 87, to thereby by-pass stripping column 203 and concentrator 80. Thus, the amount of swelling agent fed to freezer tank 99 may be reduced or even eliminated depending upon the amount of unreacted monomer present in the latex. However, this modification results in a heavier load on the freezer to agglomerate a given quantity of polymer as the latex feed to the freezer contains a lower solids content. Still other modifications are possible without departing from the invention and will be apparent to those skilled in the art.

Examples of polymerizable materials for use in preparing latex for practicing the invention are one or more ethylenically unsaturated monomers such as styrene, alpha-methylstyrene, methyl acrylate, and methyl methacrylate. If desired, the polymerizable material may be a mixture of one or more of the foregoing ethylenically unsaturated monomers with one or more conjugated diolefins capable of forming copolymers therewith. Examples of suitable conjugated diolefins are 1,3-butadiene, 2-methyl-1,3-butadiene, 2,3-dimethyl-1,3-butadiene and piperylene. Preferably, the above-mentioned copolymers contain at least 50% by weight of bound ethylenically unsaturated monomer. The preferred polymerizable material is a mixture of butadiene and styrene monomers wherein the styrene content of the mixture, by weight, is at least about 50% and sufficient to provide a bound styrene content in the resultant copolymer of 50% by weight or higher. A typical recipe in parts by weight for preparing latex of a copolymer of styrene and butadiene for use in the present invention is given below in Table I.

TABLE I

| | |
|---|---|
| Butaliene | 5–50 |
| Styrene | 95–50 |
| Potassium or sodium oleate | 1.5–5.0 |
| Electrolyte [1] | 0.2–1.5 |
| Secondary emulsifier [2] | 0–1.5 |
| Ethylenediamine tetraacetic acid tetra sodium salt [3] | [4] 0–0.10 |
| Sodium hydrosulfite | 0–0.10 |
| Water | 150–250 |
| Sodium formaldehyde sulfoxylate | 0.04–0.20 |
| Diisopropylbenzene hydroperoxide or paramethane hydroperoxide | 0.05–0.30 |
| Tertiarydodecylmercaptan | 0–0.3 |
| Ferrous sulfate heptahydrate | 0.02–0.04 |
| Versene 100 to complex ferrous sulfate | 0.03–0.06 |
| Shortstop | 0.05–0.20 |

[1] The following electrolytes or mixtures of any two may be used: Potassium chloride, sodium chloride, trisodium phosphate, tripotassium phosphate, potassium pyrophosphate, potassium sulfate, sodium sulfate, sodium borate and lithium chloride.
[2] Tamol N, Daxad 11, Nycol (Polymerized sodium salts of alkyl naphthalene sulfonic acid).
[3] Versene 100, Sequestrene 30A, or Nullapon BF–13.
[4] In soap solution.

When the latex is a resionus copolymer of styrene and butadiene containing 50% by weight or higher bound styrene, then it is useful in the production of latex paints, paper coatings, etc. Preferably, the bound styrene content should be about 55–75% by weight, but bound styrene contents of 50–55% by weight are satisfactory for many known uses. It has not been possible heretofore to agglomerate such high styrene latices to enlarge the average particles size in the resultant latex using freeze-thaw agglomeration in accordance with prior art processes as an irreversible gel or prefloc precipitated out on thawing. As a result, high styrene latices are presently prepared at a maximum of about 48–50% solids content due to the lack of a commercially satisfactory process for agglomerating the latex to a level sufficient to allow concentrations to a higher solids content such as 55–60% or even 65% TSC.

The latex to be agglomerated is frozen and thawed in the presence of at least one water-insoluble organic liquid swelling agent for the polymer in an amount effective to swell the particles of polymer. The particles of polymer are swollen by the swelling agent at the time of freezing and thawing. Some improvement in freeze-thaw stability or agglomeration is obtained with even a very small amount of swelling and an increase in the degree of swelling above this level results in further improvement, up to the maximum level of swelling agent defined herein. The presence of the swelling agent or solvent in the polymer allows the polymer particles to agglomerate to a larger size than would otherwise be possible and, surprisingly, with accompanying control of the formation of irreversible gel or prefloc. Usually, prefloc formation is reduced considerably over that obtained under similar freeze-thaw agglomeration conditions but in the absence of the swelling agent, and especially in the freeze-thaw agglomeration of latices of resinous polymers such as styrene latex and high styrene latices.

Water-insoluble organic swelling agents or solvents for synthetic polymers are well known to the art. The more common examples are normally liquid hydrocarbons and normally liquid halogenated hydrocarbons. Examples include saturated or unsaturated hydrocarbons and their halogen derivatives containing, for example, 5–14 carbon atoms, aromatic hydrocarbons and their derivatives such as styrene, alpha-methylstyrene, benzene, tertiary butylbenzene, toluene and xylene, methyl acrylate, methyl methcrylate, turpentine, chloroform, carbon tetrachloride, chlorobenzene, cyclohexane, etc. Numerous other examples of swelling agents are known and will be apparent to those skilled in the art. In general, swelling agents capable of swelling the polymer to not less than twice its original volume when immersed in the solvent at room temperature for three days are satisfactory. Mixtures of the foregoing swelling agents may be used.

The swelling agent is present in the latex in an amount effective to swell the polymer particles and result in improved agglomeration without prohibitive amounts of prefloc formation. The amount of swelling agent providing a given degree of effectiveness in a given instance will vary with the nature of the polymer, with more highly resinous polymers requiring more swelling agent than less resinous polymers. For example, latex of a copolymer of styrene and butadiene containing 50 parts by weight of bound styrene requires only about ½–1 part by weight of styrene monomer per 100 parts of polymer as a swelling agent in order to be stable to freeze-thaw agglomeration. However, styrene latex requires a minimum of approximately 40 parts by weight of styrene per 100 parts of polymer in order to be stable to freeze-thaw agglomeration. The foregoing is shown by FIGURE 4 of the drawings, which is a graph illustrating the manner in which parts by weight of styrene monomer to be added per 100 parts of polymer varies with peracent by weight of bound styrene content in a styrene-butadiene polymer. Upon reference to FIGURE 4, the area above the curve represents latices which are stable to freeze-thaw agglomeration, while latices falling below the curve are unstable to freeze-thaw agglomeration. Thus, the curve of FIGURE 4 provides a convenient means for determining the minimum amount of swelling agent for a given styrene or styrene-butadiene latex to assure freeze-thaw stability. However, much larger amounts of swelling agent often may be present, such as up to about one part by weight of combined swelling agent and polymer for each part by weight of water. Thus, the upper limit for the swelling agent is a ratio of water to swelling agent and polymer of at least about 1:1. If this ratio is reduced to a value below 1:1, then large amounts of prefloc may be formed. Usually 1–20 parts of swelling agent are satisfactory as the minimum amount to be added to styrene-butadiene latices containing 50–80% by weight bound styrene. For styrene-butadiene latcies having a higher bound styrene content, then the lower limit may be raised to about 40 parts of swelling agent per 100 parts of polymer and the upper limit remains the same.

These percentages are likewise satisfactory in the freeze-thaw agglomeration of other types of latices. For instance, copolymers of the conjugated diolefins and ethylenically unsaturated monomers described herein containing 50–80% by weight of bound ethylenically unsaturated monomer may be freeze-thaw agglomerated in the presence of at least about 1–20 parts by weight of the swelling agent and at a ratio of water to swelling agent and polymer of at least 1:1. In instances where more than 80% by weight of bound ethylenically unsaturated monomer is present, then a minimum of about 40 parts by weight of the swelling agent per 100 parts by weight of polymer should be used and the maximum amount of swelling agent remains as stated above.

The manner of providing swelling agent in the polymer is not of importance provided the particles of polymer are swollen. Since the swelling agents are water-insoluble, in instances where the swelling agent is added to the latex the period of time normally required for swelling the polymer particles may be reduced by agitating the latex. Where the swelling agent comprises an unreacted monomer used in preparing the polymer such as an ethylenically unsaturated monomer described herein, then the polymer particles in the latex are already swollen by the unreacted monomer. Thus, a preferred method of practicing the invention is to short-stop the polymerization at a stage wherein the resultant latex contains sufficient unreacted ethylenically unsaturated monomer to provide the minimum amount of swelling agent required for free-thaw stability.

Where swelling agent is added directly to latex, the latex then should be agitated over a period of approximately ½ to 3 hours or longer in order to assure swelling of the polymer particles. However, shorter periods of time may be satisfactory in some instances and longer periods of time may be required in other instances depending upon the specific swelling agent and polymer. Preferably, substantially all of the minimum amounts of swelling agent mentioned herein should be present within hte swollen polymer particles.

After freeze-thaw agglomeration of the latex, the solvent may be removed prior to a subsequent concentration step if desired. This may be accomplished by vacuum or steam distillation. In instances where the latex is thermally concentrated, often the removal of the swelling agent may be effected in the same operation.

In order to reduce and control the viscosity of the final latex product and to further stabilize the latex, often it is desirable that a latex blend be prepared and supplied as the feed to first stage concentrator 80. Also, when operating in this manner it is possible to obtain an extremely wide and uniform distribution of particle size in the final latex product which is very desirable. The latex blend may contain amounts as small as about 5 parts by weight (on a dry solids basis) of the frozen and thawed agglomerated latex for each 100 parts of the latex blend, and amounts up to about 85 parts by weight may be used. However, better results are obtained when the latex blend comprises by weight and on a dry solids basis about 35–65 parts of the frozen and thawed agglomerated latex for each 100 parts of the latex blend, with optimum results usually being obtained when about equal parts of the two latices are used.

The process of the present invention is particularly useful for the economical production of low viscosity high solids, high styrene latices. When such latices are prepared by the preferred blend-back procedure described herein, the distribution of particle size is extremely wide and ranges from a size closely approximating the upper possible limit down to the smallest particles in the small average particle size latex used in preparing the latex blend. In addition, the uniformity of distribution of particle size is exceptional.

The following specific examples are for purposes of illustration only, and are not intended as being limiting to the spirit or scope of the appended claims. The various concentrations referred to in the examples are in parts by weight and, with respect to the latex, by weight and on a dry solids basis unless otherwise indicated.

*Example I*

This example illustrates the process of the invention using the apparatus of FIGURES 1–3 of the drawings.

Latex is prepared by a conventional "cold rubber" process using the recipe of Table I. The polymerization mixture contains 80 parts of styrene and 20 parts of butadiene by weight and it is reacted to approximately 75% conversion and then short-stopped. The bound styrene content of the polymer is 73% by weight as determined by infrared analysis. The butadiene monomer content of the latex is removed by conventional flashing and the resultant latex has a solids content of about 20%, an average polymer particle size of about 700 A., a pH of about 9–10, and contains unreacted styrene monomer.

The above original low solids, small particle size latex is pumped to storage tank 65 and used in preparing a latex blend in compartment 149 which contains by weight and when calculated on a dry solids basis 50 parts of the latex in storage tank 65 and 50 parts of the frozen and thawed agglomerated latex blend having a relatively large average particle size fed to compartment 149 via chute portion 151. The resultant latex blend is stripped free of styrene in stripping column 203, concentrated to 40% TSC in concentrator 80, and is then passed to freezer-feed tank 99 where 20 parts by weight of styrene monomer for each 100 parts of polymer is added and the latex agitated for about 3 hours.

The resultant latex blend is withdrawn from freezer-feed tank 99, passed through precooler 103 and then into pH adjustment tank 105. The latex blend is cooled to 40° F. in precooler 103 by means of indirect heat exchange with liquid ammonia. The pH of the latex blend fed to tank 105 was 9 to 10.0 and a pH adjustment step is not necessary for proper freeze-thaw agglomeration of this specific latex.

The latex blend is passed from tank 105 via overflow spout 117 into container 118, and then allowed to overflow via conduit 121 to freezer-drum tank 130 where it is agglomerated to a relatively large average particle size by means of the freezing action of freezer drum 135. The freezer drum surface 138 is maintained at a temperature of about −10° F. by means of liquid ammonia passed through interior 139 via hollow trunnions 136. The frozen agglomerated latex blend is removed from the freezer drum surface 138 by scraper 141, divided into two equal portions by means of divider blades 144, and guided down surfaces 142 by means of divider blades 144, baffles 145, and chute portions 151 and 152 into compartments 149 and 150, respectively. The frozen agglomerated latex blend is thawed in compartments 149, 150 by means of steam injected into the contents thereof via conduits 160 and 161, respectively. The latex blend is prepared in compartment 149 by controlling the ratio of feed rates in conduits 104 and 165 to provided 50 parts by weight on a dry solids basis of the frozen and thawed agglomerated latex blend for each 100 parts of the resultant latex blend.

The frozen and thawed agglomerated latex blend in compartment 150 is passed to stripping column 192 where the styrene content is removed and then charged to a second stage concentrator 171. The latex blend is concentrated to a solids content of 60% TSC and the final latex product is withdrawn via conduit 188. The final latex product has a viscosity of about 150–200 centipoises at 60% TSC and exhibits excellent mechanical stability characteristics. When desired, the latex product may be concentrated to 65% TSC and often to an even higher solids content. At 65% TSC, the viscosity is substantially under 1000 centipoises.

The latex product is very satisfactory for use in the preparation of latex paints requiring a high styrene latex and in the coating of paper.

*Example II*

A sample of the latex of Example I is frozen and thawed and found to be stable to freeze-thaw agglomeration due to the unreacted sytrene monomer content. The same latex gels upon stripping it free of styrene and then freezing.

The procedure of Example I is repeated with the exception of by-passing stripping column 203 and first stage concentrator 80 and feeding the styrene-containing latex blend directly to freezer feed tank 99, and not adding styrene monomer to the latex in tank 99. It is not necessary to add additional styrene monomer as the latex contained enough to be stable to freeze-thaw agglomeration.

The procedure of this example produces a final high solids latex product having the same characteristics as that of Example I. However, the capacity of the apparatus is lower since a lower solids latex is being frozen.

*Example III*

This example illustrates the amount of styrene monomer required for freeze-thaw stability of a series of high styrene latices prepared in the manner of Example I, with the ratio of butadiene to styrene in the polymerization mixtures being varied to provide latices having bound styrene contents from 45% by weight up. Also, the latices were stripped free of styrene.

The resultant latices were tested for freeze-thaw stability. Styrene monomer was added to samples of the latices in increasing amounts until the latex was stable to freeze-thaw agglomeration, and then the samples were agitated for three hours in order to assure that the polymer particles were swollen by the added styrene. In making the freeze-thaw stability tests, samples of the latices were frozen thoroughly and then allowed to thaw at room temperature. In instances where visible gel or prefloc formed, the latex was considered to be "gelled" and thus unstable to freeze-thaw agglomeration. Samples which contained no visible gel or prefloc were considered to be "thawed" and stable to freeze-thaw agglomeration.

Bound styrene content in the polymers was determined by infrared analysis.

The data thus obtained were recorded and plotted in the form of the graph appearing in the drawings as FIGURE 4. It was also found that hexane, benzene and toluene affected the freeze-thaw stability of the latices in the same manner as styrene. Carbon tetrachloride and turpentine also were effective.

*Example IV*

A series of high styrene latices were prepared in the manner of Example I, but with the ratio of butadiene to styrene in the polymerization mixtures and the percent conversion being varied over wide ranges. The resultant latices were substantially free of unreacted butadiene monomer but contained the unreacted styrene monomer.

The above latices were tested for freeze-thaw stability both before and after stripping following the test procedure of Example III.

The results are recorded below in Table II.

TABLE II

| Sample No. | Butadiene/Styrene Ratio | Percent Conversion | g. Free-styrene/g. polymer Before Stripping | Percent Bound Styrene | Frozen Without Stripping | Frozen Stripped |
| --- | --- | --- | --- | --- | --- | --- |
| 1 | 20/80 | 66 | 0.371 | 75.6 | Thawed | Gelled. |
| 2 | 20/80 | 85 | 0.136 | 79.85 | ---do----- | Do. |
| 3 | 30/70 | 60 | 0.416 | 65.8 | ---do----- | Do. |
| 4 | 30/70 | 75 | 0.263 | 67.05 | ---do----- | Do. |
| 5 | 30/70 | 88 | 0.104 | 69.0 | ---do----- | Do. |
| 6 | 35/65 | 61 | 0.379 | 54.4 | ---do----- | Do. |
| 7 | 35/65 | 70 | 0.248 | 55.5 | ---do----- | Do. |
| 8 | 35/65 | 84 | 0.198 | 58.8 | ---do----- | Do. |
| 9 | 40/60 | 68 | 0.240 | 58.0 | ---do----- | Do. |
| 10 | 40/60 | 75 | 0.180 | 59.8 | ---do----- | Do. |
| 11 | 45/55 | 61 | 0.338 | 46.4 | ---do----- | Do. |
| 12 | 45/55 | 64 | 0.242 | 55.0 | ---do----- | Do. |
| 13 | 50/50 | 57 | 0.215 |  | ---do----- | Do. |
| 14 | 50/50 | >90 | 0.018 | 44.9 | 2% gel | Thawed. |
| 15 | 45/55 | >90 | 0.018 | 51.2 | 1% gel | Gelled. |
| 16 | 40/60 | >90 | 0.030 | 55.7 | 4% gel | Do. |
| 17 | 35/65 | >90 | 0.037 | 62.1 | Gelled | Do. |
| 18 | 30/70 | >90 | 0.048 | 54.7 | ---do----- | Do. |
| 19 | 20/80 | >90 | 0.048 | 78.2 | ---do----- | Do. |

*Example V*

Latex was prepared following the general procedure of Example I. The styrene to butadiene charge ratio was 80 to 20 and the reaction was terminated at 75% conversion. This resulted in a latex containing about 73% bound styrene content.

One portion of the latex was stripped, the average particle size measured, concentrated to 47% TSC and treated with a large excess of benzene (176% by weight based on the polymer present in the latex). Thereafter, the latex thus treated was stripped and the average particle size measured again.

A second portion of the latex was treated with 30% by weight (base on polymer present in the latex) of styrene and then frozen. After thawing the frozen latex, it was stripped and the particle size measured.

The average particle size determined as above were as follows:

Sample of latex: Particle size, angstroms
   Untreated stripped latex _____ 710
   Benzene treated latex _____ 890
   Styrene treated frozen latex _____ 2375

The above data clearly show the advantage of freeze-thaw agglomeration for increasing the average particle size.

A third sample of the latex was stripped, concentrated to 40% solids and treated with varying amounts of benzene. The amount of benzene added, the ratio of hydrocarbon (benzene plus polymer) to water present in the latex, and the viscosity of the mixture were determined and recorded as indicated in the following table:

TABLE III

| Sample No. | Ratio of hydrocarbon to water (by weight) | Viscosity, cp. |
| --- | --- | --- |
| a | 1 to 1.5 | 25 |
| b | 1 to 1.35 | 94 |
| c | 1 to 1.18 | 513 |
| d | 1 to 1.13 | 1,900 |
| e | 1 to 1.08 | 2,756 |
| f | 1 to 1.04 | 3,424 |
| g | 1 to 1 | 5,320 |
| h | 1 to 0.97 | 6,080 |
| i | 1 to 0.93 | 7,280 |
| j | 1 to 0.89 | 15,480 |

From the above data, it may be seen that the viscosity of the latex increases quite rapidly as the amount of swelling agent or solvent is increased. When the amount of added benzene was sufficient to give a ratio of hydrocarbon to water greater than about 1:1 by weight, then the viscosity was so high that the mixture was unstable. Upon freezing samples g and j above, the following results were obtained:

Sample: Average particle size
   a _____ 710 A.
   g _____ 2700 A.
   j _____ Completely flocced out.

We claim:

1. In a process for agglomerating latex wherein the average particle size of polymer in the resultant agglomerated latex is enlarged by steps including freezing and thawing, the improvement comprising freezing and thawing at least one latex selected from the group consisting of latices of homopolymers of ethylenically unsaturated monomers selected from the group consisting of styrene, alphamethylstyrene, methyl acrylate and methyl methacrylate, and latices of copolymers of said ethylenically unsaturated monomers and conjugated diolefins selected from the group consisting of 1,3-butadiene, 2-methyl-1,3-butadiene, 2,3-dimethyl-1,3-butadiene and piperylene containing at least 80% by weight of bound ethylenically unsaturated monomer, in the presence of at least one water insoluble organic liquid swelling agent for the polymer selected from the group consisting of normally liquid saturated hydrocarbons, normally liquid saturated halogenated hydrocarbons, benzene, tertiary butyl benzene, toluene, xylene, chlorobenzene, and cyclohexane in an amount effective to swell the particles of polymer, the swelling agent being present in an amount of at least 40 parts by weight for each 100 parts by weight of the latex when calculated by weight and on a dry solid basis, the particles of polymer being swollen by the swelling agent at the time of freezing and thawing the latex and the weight ratio of water to swelling agent and polymer being at least about 1:1.

2. The process of claim 1 wherein latex of a homopolymer of styrene is agglomerated.

3. In a process for agglomerating latex of a copolymer of styrene and 1,3-butadiene wherein the average particle size of the copolymer is enlarged in the resultant agglomerated latex by steps including freezing and thawing, the improvement comprising freezing and thawing latex of a copolymer of 1,3-butadiene and styrene having a bound styrene content greater than 80% by weight in the presence of at least one water insoluble organic liquid swelling agent for the copolymer selected from the group consisting of normally liquid saturated hydrocarbons, normally liquid saturated halogenated hydrocarbons, benzene, tertiary butyl benzene, toluene, xylene, chlorobenzene, and cyclohexane, the swelling agent being present in the latex in an amount of at least 40 parts by weight for each 100 parts by weight of the latex when calculated by weight and on a dry solid basis and the weight ratio of water to swelling agent and copolymer being at least 1:1.

References Cited by the Examiner

UNITED STATES PATENTS

| | | | |
|---|---|---|---|
| 2,444,801 | 7/48 | Arundale | 260—29.7 |
| 2,494,002 | 1/50 | Rumbold | 260—29.7 |
| 2,847,168 | 7/59 | Brown | 260—29.1 |
| 2,993,020 | 7/61 | Carpenter | 260—29.7 |
| 3,031,427 | 4/62 | Talalay | 260—29.7 |
| 3,081,275 | 3/63 | Reynolds | 260—29.7 |

FOREIGN PATENTS

| | | |
|---|---|---|
| 1,117,427 | 7/59 | France. |
| 1,214,439 | 11/59 | France. |
| 758,622 | 10/56 | Great Britain. |

MURRAY TILLMAN, *Primary Examiner.*

D. ARNOLD, LEON J. BERCOVITZ, *Examiners.*

UNITED STATES PATENT OFFICE

CERTIFICATE OF CORRECTION

Patent No. 3,214,401                                       October 26, 1965

James P. McKenzie et al.

It is hereby certified that error appears in the above numbered patent requiring correction and that the said Letters Patent should read as corrected below.

Column 3, line 29, for "tanks" read -- tank --; line 69, for "reduced" read -- reduce --; column 7, line 15, for "frozzen" read -- frozen --; column 9, line 33, for "50-55%" read -- 50-95% --; line 74, for "methcrylate" read -- methacrylate --; column 10 line 25, for "peracent" read -- percent --; line 44, for "latcies" read -- latices --; column 11, line 1, for "free-thaw" read -- freeze-thaw --; line 11, for "hte" read -- the --; column 12, line 27, for "149, 150" read -- 149 and 150 --; line 73, for "Example I, with" read -- Example I, but with --.

Signed and sealed this 16th day of August 1966.

(SEAL)
Attest:

ERNEST W. SWIDER
Attesting Officer

EDWARD J. BRENNER
Commissioner of Patents